Patented Apr. 21, 1953

2,636,046

UNITED STATES PATENT OFFICE 2,636,046

PREPARATION OF POLYFUNCTIONAL COMPOUNDS

William F. Gresham, Wilmington, Del., assignor to E. I. du Pont de Nemours & Company, Wilmington, Del., a corporation of Delaware No Drawing. Application October 16, 1948, Serial No. 55,016

8 Claims. (Cl. 260—449.6)

This invention relates to a novel synthesis of polyfunctional oxygen-containing organic compounds and more particularly to the preparation of polyhydric alcohols and their derivatives by reactions involving the use of carbon monoxide and/or carbon dioxide and hydrogen as starting materials. This application is a continuation-in-part of my copending application S. N. 793,521, which was filed on December 23, 1947, and is now abandoned.

It has been known for many years that monofunctional compounds, such as methanol, can be obtained by reaction between carbon monoxide and hydrogen at elevated pressures, e. g. at pressures up to about 1000 atmospheres. By reaction between carbon monoxide and methanol in the presence of certain types of catalysts, other monofunctional compounds such as acetic acid, methyl acetate, etc., have also been obtained. It has been reported that formaldehyde can be produced by reaction between carbon monoxide and hydrogen at elevated pressures but repeated attempts to carry out this synthesis of formaldehyde have invariably failed to yield any substantial quantity of the desired product. It is generally recognized that the previously disclosed processes for the synthesis of formaldehyde from carbon monoxide and hydrogen at high pressures are either completely inoperative or else give rise to insignificantly small quantities of formaldehyde. In no instance has any polyfunctional compound been obtained heretofore by reaction between carbon monoxide, or any other oxide of carbon, and hydrogen.

An object of this invention is to provide a process for the preparation of polyfunctional oxygen-containing organic compounds by reaction between an oxide of carbon and hydrogen. Another object of the invention is to provide a process for the synthesis of ethylene glycol directly from carbon monoxide and hydrogen. Still another object is to provide a process for the synthesis of glycerol from carbon monoxide and hydrogen. Other objects of the invention will appear hereinafter.

It has been discovered in accordance with this invention that, if the hydrogenation of an oxide of carbon is carried out at a sufficiently high pressure, polyfunctional compounds are produced. The present invention thus provides an entirely new method for preparing polyhydric alcohols and derivatives thereof from carbon monoxide and hydrogen, in accord with the equation $nCO + (n+1)H_2 = H(CHOH)_nH$, $n$ being an integer greater than 1. In a specific embodiment this reaction is carried out in the presence of an esterifying reactant, such as acetic acid, whereby esterification of the hydroxyl groups in the compound $H(CHOH)_nH$ can occur, at least in part. Frequently, in the practice of the invention, formate esters of the compounds of the formula $H(CHOH)_nH$ are produced simultaneously with the free polyhydroxy compounds.

It has been discovered in accordance with the present invention that by reacting an oxide of carbon with hydrogen at pressures above 1000 atmospheres, and particularly above a minimum of about 1400 atmospheres, polyfunctional oxygen-containing organic compounds such as ethylene glycol, higher polyhydric alcohols, and esters of polyhydric alcohols can be obtained very readily and in excellent yield. This discovery is believed to be very basic and novel and is believed to constitute a wide departure from anything taught or suggested by the prior art relating to the hydrogenation of oxides of carbon.

The formation of ethylene glycol, and formates thereof, from carbon monoxide and hydrogen in accordance with this invention may be represented as follows:

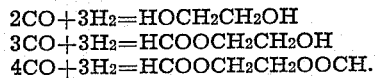

Glycerol triacetate is also obtained in the practice of the invention, under conditions specified hereinafter, in accordance with the following equation:

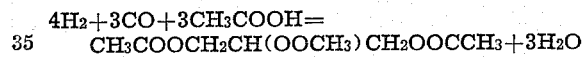

In the hydrogenation of oxides of carbon at pressures of 1000 atmospheres and below, virtually no polyfunctional compounds are produced. At pressures above 1000 atmospheres and especially at pressures of about 1500 to 5000 atmospheres, preferably 2000 to 5000 atmospheres, polyfunctional compounds are obtained. For best results from the standpoint of rate of reaction and yield, it is desirable to employ certain specific catalysts, as disclosed in detail hereinafter. At pressures as low as about 1400 to 1500 atmospheres it is, in general, necessary to employ a relatively large quantity of catalyst, or a relatively high temperature, to obtain as rapid a reaction as is readily realized at higher pressures with less catalyst.

The reaction between carbon monoxide or carbon dioxide and hydrogen in accordance with this invention may be carried out either in the vapor phase or in the liquid phase. Inert diluents may be employed as desired, such as inert organic solvents, e. g. inert hydrocarbons (liquid alkanes, cycloalkanes, benzene, alkyl benzenes, etc.), ethers, and the like. It is also possible to employ solvents which react with the polyhydric alcohols which are in general produced in the practice of the invention. These reactive solvents include organic compounds containing active hydrogen atoms such as carboxylic acids and anhydrides of organic carboxylic acids, such as formic acid, acetic acid, propionic acid, stearic acid, benzoic acid, phthalic anhydride, acetic anhydride, benzoic anhydride; monohydric alcohols, polyhydric alcohols; esters, primary and secondary amines, ammonia; ketones, hydrogen cyanide, compounds with active hydrogen atoms alpha to a carbonyl or nitrile group, etc. Polyhydric alcohol esters may be employed as reaction media in the practice of the invention; for example, glycol formates or acetates may be used, particularly in embodiments which involve recycling of a part of the reaction mixture. The presence of either inert or reactive diluents facilitates removal of heat from the reaction mixture. A suitable diluent which can be employed in the practice of the invention is ordinary water, which, in preferred embodiments, may be present in sufficient quantity to prevent the formation of hydrolyzable products, such as esters, if desired.

Certain solvents have a highly significant directing effect upon the course of the reaction, in the practice of this invention. For example, if water is used water-soluble difunctional compounds such as ethylene glycol and its formate esters, are formed selectively. When the solvent is acetic acid, glycerol and glyceryl acetates (evidently via the reaction $$3CO + 4H_2 = CH_2OHCHOHCH_2OH)$$

are produced along with ethylene glycol and its acetate esters.

Either heterogeneous or homogeneous reaction mixtures may be employed in the practice of the invention. For example, catalysts which are soluble in at least one of the ingredients of the reaction mixture may be employed effectively. It is not essential, however, that the catalyst be in the dissolved state, for satisfactory results are also obtained with catalysts which are not homogeneously distributed throughout the reaction mixture or throughout any patricular ingredient thereof. Solid catalysts which remain in place during the course of the reaction may be employed satisfactorily. Suspensions of liquid or solid catalysts in liquid or gaseous media may also be employed. Hydrogenation catalysts, preferably those which are capable of giving rise to the formation of metal carbonyls upon reaction with carbon monoxide are especially useful. These include catalysts containing cobalt, ruthenium, etc. If desired, the catalysts employed in the practice of this invention may be used in combination with each other or in combination with inert materials or supports such as alumina, silica gel, activated charcoal, etc. The most outstanding results are obtained through the use of catalysts containing cobalt, especially compounds of cobalt which are soluble in at least one of the ingredients of the reaction mixture. All of the salts of cobalt may thus be employed, and are very highly effective as catalysts in the practice of the present invention. Cobalt salts of organic carboxylic acids give excellent results, especially when employed in the dissolved state. Outstanding catalysts include metallic cobalt, and cobalt compounds which yield cobalt carbonyl under the reaction conditions. Excellent results are obtained with cobalt acetate, cobalt naphthenate, cobalt carbonyl, cobalt carbonyl hydride, cobalt carbonyl complexes and cobalt salts of inorganic acids. The quantity of catalyst which is employed is not highly critical but it is generally desirable to use a sufficient quantity of catalyst to effect a reasonably rapid reaction, e. g., about 0.001% to about 20% by weight, based on the total quantity of reaction mixture. Metal compounds or salts obtained from reaction products containing metal carbonyl complexes by heating to the carbonyl decomposition temperatures and effecting separation therefrom are effective catalysts when recycled in the synthesis operation. In certain instances in which water is used as a solvent, and a cobalt salt is introduced as catalyst, a clear reaction product is obtained; this aqueous product contains one or more volatile cobalt compounds which can be recovered by distillation in the presence of carbon monoxide and recycled for further use as catalyst for the reaction.

The temperatures which may be employed in the practice of the invention vary rather widely, and in preferred embodiments, the use of extremely high pressures permits carrying out the reaction at relatively low temperatures. The rate of formation of polyfunctional organic product obtainable at temperatures below 150° is extremely slow even at pressures in excess of about 2000 atmospheres. It is therefore desirable to employ temperatures above 150° to obtain a reasonably high reaction rate even though, from the standpoint of the composition of the reaction mixture under equilibrium conditions, it is desirable to operate at as low a temperature as possible. Temperatures above about 400° are generally not preferred even at pressures as high as 3000 atmospheres, because while the rate of formation of glycol or other polyfunctional product is improved by increasing the reaction temperature, the yield, based upon the quantity of carbon monoxide and hydrogen initially present, is poor at temperatures above about 400° C. Within the relatively narrow temperature range of 180° to 300° C., at pressures above 1500 atmospheres, outstanding results are obtained from the standpoint of yield and reaction rate.

The relative amounts of carbon monoxide and hydrogen which are present initially in the reaction mixture in the practice of the invention may be varied over a wide range but it is generally preferred that the mol ratio of $CO:H_2$ be within the range of 20:1 to 1:20, best results being obtained when the ratio of $CO:H_2$ is from about 3:1 to about 1:3. It is, of course, to be understood that reaction mixtures which give rise to the formation of carbon monoxide and hydrogen under the reaction conditions may be employed instead of the mixtures of carbon monoxide and hydrogen which are used in preferred embodiments in the practice of the invention. For example, good results are obtained when the reaction mixture is composed of carbon dioxide and hydrogen. Mixtures of carbon dioxide and carbon monoxide with hydrogen may of course also be employed. Other mixtures such as carbon monoxide and steam may be used if desired. Metal carbonyls and metal carbonyl complexes may be used to supply the carbon monoxide reactant, and the quantity of metal carbonyl thus employed may be varied over the widest possible range; in certain instances, this tends to lower somewhat the pressure which is required for the formation of polyfunctional compounds in the practice of the invention.

The process of the invention may be carried out either continuously or batchwise. Optimum results are generally obtained at the shortest reaction times capable of giving an appreciable conversion to the desired product. When primary reaction products, or simple difunctional compounds, are desired in maximum yield (i. e., without the formation of excessive quantities of by-products), it is preferable to operate at relatively low conversions. In the continuous process it is generally desirable to recirculate the unreacted gas, preferably with make-up carbon monoxide and hydrogen. In one preferred method of practicing the invention a high pressure separator is employed to remove the polyfunctional organic product (e. g., ethylene glycol crude or solution thereof, e. g., aqueous solution of ethylene glycol), from the reaction mixture. Other methods known in the art may be employed for separating from the reaction mixture the polyfunctional compounds obtained in the practice of this invention. Suitable methods include distillation, fractional condensation, extraction, etc.

Since the formation of polyhydric alcohols and the like from carbon monoxide and hydrogen in accordance with this invention is an exothermic process, suitable means should be provided for withdrawal of heat from the reaction mixture while the reaction is in progress. This removal of heat can be accomplished by any convenient method and in a specific embodiment is effected by carrying out, simultaneously with the reaction between the oxide of carbon and hydrogen, an endothermic process under such conditions that the heat evolved by the exothermic reaction is at least in part absorbed by the endothermic process. Also, diluents, such as water, etc., may be used to assist in withdrawal of the heat of reaction.

The reaction between the oxide of carbon and hydrogen in accordance with this invention can be carried out in any suitable reaction vessel capable of withstanding very high pressures. Reaction vessels which are made of or lined with materials which remain inert in the presence of the reaction mixture are preferably employed, i. e. the reaction vessel may be made of steel which, if desired, can be lined with such inert materials as silver, copper, platinum, gold, platinum-iridium alloy, platinum-ruthenium alloy, refractories, etc. It should be understood that in the present state of the art of carrying out organic reactions batchwise at a pressure of 3000 atmospheres at short reaction times, significant quantitative data are best obtained by carrying out several virtually identical runs, and averaging the results thereof. Thus in a large number of experiments using a cobalt salt of an organic carboxylic acid as catalyst at about 270° C., 3000 atmospheres, in a reaction vessel of 200 to 250 cc. capacity, carbon monoxide reacted with hydrogen to give the following quantities of ethylene glycolethylene glycol formate, in a reaction time of about 10 minutes: (1) aqueous medium, about 5 grams; (2) toluene or benzene medium, about 10 to 17 grams; (3) part water and part hydrocarbon as reaction medium, 5 to 17 grams.

The invention is illustrated further by means of the following examples.

*Example 1.*—A mixture of carbon monoxide and hydrogen containing these gases in equal mol proportions was heated at a temperature of 184° to 242° C. under a pressure of 3000 atmospheres in the presence of acetic acid containing 0.035 gram of cobalt acetate catalyst per cc. The chief reaction products were polyhydric alcohol esters boiling in the range of ethylene glycol diacetate and glycerol triacetate.

*Example 2.*—A mixture of carbon monoxide and hydrogen containing these gases in a mol ratio of 2 carbon monoxide to 1 hydrogen, when heated under a pressure of 3000 atmospheres at 225° to 246° C. for 1 hour in the presence of acetic acid containing 0.035 gram of cobalt acetate per cc., gave 13.7 grams polyhydric alcohol esters which were shown by analysis to be ethylene glycol diacetate and glycerol triacetate. In addition, essentially an equal quantity of lower boiling esters was produced containing chiefly propyl acetate and ethyl acetate along with small quantities of isopropyl and methyl acetate.

*Example 3.*—Products similar to those obtained from Examples 1 and 2 were obtained when a 1:2 mol ratio of carbon monoxide to hydrogen was processed at 3000 atmospheres and 212–246° for 30 minutes in the presence of acetic acid containing 0.007 gram of cobalt acetate catalyst per cc.

*Example 4.*—Seventy-two grams of water containing 2 grams of cobalt acetate hydrate catalyst was placed in a reaction vessel of 240 cc. capacity and pressured to 3000 atmospheres with a gas mixture composed of carbon monoxide and hydrogen in equal mol proportions at a temperature of 190° to 280° C. for 1 hour. The liquid product was withdrawn from the reaction vessel and distilled. After removal of lower boilers and water, there was obtained 3.9 grams of product boiling in the ethylene glycol range. By analysis this product contained 22.3% free ethylene glycol and the remainder was a mixture of ethylene glycol monoformate and ethylene glycol diformate.

*Example 5.*—When a 1:1 mixture of carbon monoxide and hydrogen was processed at 1800 to 2000 atmospheres and 266° to 277° C. for 30 minutes in the presence of 144 grams of water and 4 grams of cobalt acetate hydrate, the resulting product contained 4.8 grams of ethylene glycol+ethylene glycol formates.

*Example 6.*—A mixture consisting of 72 grams of water, 14.4 grams of cobalt acetate tetrahydrate was heated at 1400 to 1500 atmospheres with $1CO:1H_2$ at 257° to 265° C. for 30 minutes in a copper-lined reaction vessel. Distillation of the product gave 3.5 grams of ethylene glycol-ethylene glycol formate, and 8.3 grams of lower boiling product.

*Example 7.*—A mixture of 72 grams of water and 2 grams of cobalt acetate was processed at 256° to 267° C. with carbon monoxide and hydrogen (molar ratio of 1:1) under 2740 to 3000 atmospheres pressure in a stainless steel reaction vessel of 240 cc. capacity. After 30 minutes of operation the product which was formed contained 4.7 grams of mixed ethylene glycol and ethylene glycol formates, and only 0.7 gram of all other reaction products.

*Example 8.*—A mixture consisting of 46 grams of toluene and 1 gram of anhydrous cobalt acetate was heated with carbon monoxide and hydrogen (mole ratio 1:1) under about 2650 to 3000 atmospheres pressure for 15 minutes at 260° to 270° C. The resulting product, when withdrawn from the reaction vessel, contained two liquid layers. Distillation of the product gave 68.6 grams of fractions boiling from 58° to 113°, following which 17.4 grams of a mixed ethylene glycol and ethylene glycol formate fraction was collected.

*Example 9.*—A mixture consisting of 18 grams of toluene, 18 grams of water, and 1 gram of cobalt acetate was heated at 270° to 271° C. for 10 minutes with a mixture of carbon monoxide and hydrogen (mole ratio, 2:3) at a pressure of 2900 to 3000 atmospheres. The resulting product was distilled, and the ethylene glycol-ethylene glycol formates fraction was collected. Three such runs were made, and the average amount of ethylene glycol-ethylene glycol formates fraction produced was 7.4 grams.

*Example 10.*—A mixture consisting of 18 grams of n-heptane, 18 grams of water, and 1 gram of cobalt acetate was heated at 270° to 272° C. for 10 minutes under a pressure of 2900 to 3000 atmospheres of a mixture of carbon monoxide and hydrogen (mole ratio, 2:3). Distillation of the resulting product gave 5.6 grams of a mixture of ethylene glycol and ethylene glycol formates.

*Example 11.*—A mixture consisting of 18 grams of water, 18 grams of benzene, and 1 gram of cobalt acetate was heated for 10 minutes with carbon monoxide and hydrogen (mole ratio, 2:3) under 2900 to 3000 atmospheres pressure at a temperature within the range of 267° to 280° C. after which the reaction mixture was distilled. This experiment was repeated six times; in the poorest of these runs the weight of the ethylene glycol+ethylene glycol formates fraction was 5.4 grams, and in the best of these runs the weight of the ethylene glycol+ethylene glycol formates fraction was 16.9 grams. In the latter experiment the weight of lower-boiling reaction product was only 1.9 grams.

*Example 12.*—A mixture consisting of 84 grams cyclohexane and 2 grams of dehydrated cobalt acetate was heated with 100:1H$_2$ at 1435 to 1500 atmospheres pressure, at a temperature of 260° to 264° C. for 30 minutes. Distillation of the resulting product gave 1.5 grams of material boiling in the range of ethylene glycol and ethylene glycol formates. Repetition of the experiment at 285° to 292° C. gave 2.0 grams of substantially the same product.

It is to be understood that the above examples are illustrative only and that numerous ways of practicing the invention will occur to those who are skilled in the art.

The present invention is useful in that it provides a process for the synthesis of the lower polyhydric alcohols, and other products, directly from cheaper source materials than heretofore were required in the manufacture of these products.

The present invention is not related in any way to processes for the conversion of formaldehyde and water to glycolic acid followed by hydrogenation of the glycolic acid thus produced, or an ester thereof, to form ethylene glycol. The aforesaid process requires the use of formaldehyde as a starting material. Repeated attempts to detect the presence of formaldehyde in the products obtained in the practice of this invention have given negative results. The present invention does not rely upon the formation of glycolic acid from formaldehyde, carbon monoxide and water. The mechanism of the reaction whereby polyhydric alcohols are obtained from carbon monoxide and hydrogen at very high pressures is not known with certainty but all of the evidence now available indicates that the reaction does not proceed through the formation of formaldehyde as an initial reaction product. No formaldehyde has been isolated in the reaction mixtures obtained in the practice of the invention. Attempts to prepare formaldehyde from carbon monoxide and hydrogen at very high pressures have invariably met with failure. It is of course true, as disclosed in the copending application S. N. 590,960, filed April 28, 1945, now U. S. Patent 2,451,333, that formaldehyde can react with carbon monoxide and hydrogen to form polyhidric alcohols. It is possible that this reaction prevents the formation of formaldehyde as a primary reaction product. In any event, I do not wish to be bound by any theory which might explain the formation of polyfunctional compounds from carbon monoxide and hydrogen at elevated pressures in accordance with the present invention. It is in fact quite possible that polyfunctional compounds are formed as primary products rather than as products which result from a series of reactions starting with carbon monoxide and hydrogen. The carbon atom in carbon monoxide is believed to be somewhat electropositive and this may at least in part explain the formation of polyfunctional compounds once hydrogen atoms have become attached to the carbon atom and the oxygen atom of carbon monoxide.

I claim:

1. The method for preparing polyfunctional oxygen-containing organic products including as a component ethylene glycol which comprises interacting carbon monoxide and hydrogen as the sole reactants in the presence of a cobalt-containing catalyst at a pressure of 1500 to 5000 atmospheres, the ethylene glycol component of the product being formed in accord with the equation: $2CO + 3H_2 = HOCH_2CH_2OH$.

2. The process of reacting carbon monoxide with hydrogen as the sole reactants at a pressure within the range of 2000 to 5000 atmospheres at a temperature of 150° to 400° C. in the presence of a catalytic quantity of a cobalt salt of an organic carboxylic acid dissolved in at least one of the ingredients of the reaction mixture, and thereafter separating from the resulting mixture polyfunctional oxygen-containing organic products formed by the ensuing hydrogenation of the oxide of carbon.

3. The process of reacting carbon monoxide with hydrogen as the sole reactants at a pressure within the range of 2000 to 5000 atmospheres at a temperature of 180° to 300° C. in the presence of a catalytic quantity of a cobalt salt of an organic carboxylic acid dissolved in at least one of the ingredients of the reaction mixture, and thereafter separating from the resulting mixture polyfunctional oxygen-containing organic products formed by the ensuing hydrogenation of the oxide of carbon.

4. The process of claim 3, performed in the presence of an inert liquid diluent.

5. A process for the manufacture of polyfunctional compounds which comprises reacting carbon monoxide with hydrogen at a pressure within the range of 2000 to 5000 atmospheres at a temperature within the range of 180° to 300° C. in the presence of a catalytic quantity of a cobalt salt of an organic carboxylic acid dissolved in an aliphatic carboxylic acid which is liquid under the reaction condition, whereby esters of ethylene glycol and of glycerol are produced simultaneously, and thereafter recovering the said esters from the resulting mixture.

6. The process of claim 5 in which the aliphatic carboxylic acid is acetic acid.

7. The process which comprises reacting carbon monoxide with hydrogen as the sole reactants at a pressure within the range of 2000 to 5000 atmospheres at a temperature within the range of 180° to 300° C. in the presence of a catalytic quantity of cobalt acetate dissolved in water, whereby ethylene glycol formates and ethylene glycol are produced, and thereafter separating said ethylene glycol formates and ethylene glycol from the resulting reaction mixture.

8. The process of claim 7, conducted at a pressure of 3000 atmospheres.

WILLIAM F. GRESHAM.

References Cited in the file of this patent

UNITED STATES PATENTS

| Number | Name | Date |
|---|---|---|
| 1,741,307 | Jaeger | Dec. 31, 1929 |
| 2,429,878 | Gresham | Oct. 28, 1947 |
| 2,451,333 | Gresham et al. | Oct. 12, 1948 |

FOREIGN PATENTS

| Number | Country | Date |
|---|---|---|
| 300,294 | Great Britain | Nov. 7, 1928 |
| 313,467 | Great Britain | June 10, 1929 |